United States Patent
Yoshimura (10) Patent No.: US 10,144,283 B2
(45) Date of Patent: Dec. 4, 2018

(54) RIGHT AND LEFT DRIVING FORCE DISTRIBUTION UNIT FOR FOUR-WHEEL DRIVE VEHICLE

(71) Applicant: TOYOTA JIDOSHA KABUSHIKI KAISHA, Toyota-shi, Aichi-ken (JP)

(72) Inventor: Takahiro Yoshimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 420 days.

(21) Appl. No.: 15/039,260

(22) PCT Filed: Nov. 25, 2014

(86) PCT No.: PCT/IB2014/002556
§ 371 (c)(1),
(2) Date: May 25, 2016

(87) PCT Pub. No.: WO2015/075541
PCT Pub. Date: May 28, 2015

(65) Prior Publication Data
US 2017/0036540 A1 Feb. 9, 2017

(30) Foreign Application Priority Data

Nov. 25, 2013 (JP) .................................. 2013-243326
Nov. 5, 2014 (JP) .................................. 2014-225629

(51) Int. Cl.
*B60K 17/02* (2006.01)
*B60K 23/08* (2006.01)
(Continued)

(52) U.S. Cl.
CPC .............. *B60K 23/08* (2013.01); *B60K 17/02* (2013.01); *B60K 17/344* (2013.01); *F16D 11/00* (2013.01);
(Continued)

(58) Field of Classification Search
CPC .... B60K 17/02; B60K 17/344; B60K 17/346; B60K 23/08; F16D 11/10; F16D 41/185
(Continued)

(56) References Cited

U.S. PATENT DOCUMENTS

1,033,084 A * 7/1912 Collins .................... F16H 3/08
475/203
4,788,888 A * 12/1988 Tsutsumikoshi ....... B60K 17/35
180/250
(Continued)

*Primary Examiner* — William C Joyce
(74) *Attorney, Agent, or Firm* — Oliff PLC (57) ABSTRACT

A cylindrical ring gear has first external teeth and a support portion in an axial direction of the cylindrical ring gear. An output shaft extends through the cylindrical ring gear and is supported to rotate concentrically with the cylindrical ring gear. A disconnect mechanism is configured to connect or disconnect an inner periphery of the cylindrical ring gear to an outer periphery of the output shaft based on a moved position of the movable engagement member. An actuator is disposed such that the first external teeth are located between the support portion and the actuator. The actuator is configured to move the movable engagement member between a connection position and a disconnection position. The cylindrical ring gear is coupled to the output shaft so as to be relatively non-rotatable in the connection position. Relative rotation between the cylindrical ring gear and the output shaft is allowed in the disconnection position.

5 Claims, 6 Drawing Sheets (51) Int. Cl.
*B60K 17/344* (2006.01)
*F16D 11/10* (2006.01)
*F16D 41/18* (2006.01)
*F16D 11/00* (2006.01)
*F16D 13/52* (2006.01)
*F16D 27/04* (2006.01)
*F16H 48/19* (2012.01)
*B60K 17/348* (2006.01)
*B60K 23/04* (2006.01)

(52) U.S. Cl.
CPC .............. *F16D 11/10* (2013.01); *F16D 13/52* (2013.01); *F16D 27/04* (2013.01); *F16D 41/185* (2013.01); *F16H 48/19* (2013.01); *B60K 17/348* (2013.01); *B60K 2023/043* (2013.01)

(58) Field of Classification Search
USPC .......................................................... 74/650
See application file for complete search history.

(56) References Cited

U.S. PATENT DOCUMENTS

| | | | |
|---|---|---|---|
| 4,981,192 A | 1/1991 | Kurihara et al. | |
| 6,432,021 B1* | 8/2002 | Averill | B60K 17/35 475/237 |
| 6,450,915 B1* | 9/2002 | Kazaoka | B60K 17/35 180/247 |
| 8,313,407 B2 | 11/2012 | Ekonen et al. | |
| 8,469,854 B1* | 6/2013 | Downs | B60K 23/08 475/221 |
| 2012/0234120 A1* | 9/2012 | Fukuda | B60K 17/344 74/405 |
| 2012/0325030 A1 | 12/2012 | Kinsey et al. | |
| 2013/0333503 A1* | 12/2013 | Peura | F16H 1/12 74/405 |
| 2015/0165901 A1* | 6/2015 | Tamoto | F16D 27/118 475/230 |

\* cited by examiner

RIGHT AND LEFT DRIVING FORCE DISTRIBUTION UNIT FOR FOUR-WHEEL DRIVE VEHICLE

BACKGROUND OF THE INVENTION

1. Field of the Invention

The invention relates to a right and left driving force distribution unit in a four-wheel drive vehicle.

2. Description of Related Art

In a four-wheel drive vehicle, one of a two-wheel drive mode and a four-wheel (all-wheel) drive mode is selected. In the two-wheel drive mode, driving force is transmitted from a driving source to front or rear right and left main drive wheels. In the four-wheel (all-wheel) drive mode, driving force is transmitted from the driving source to the main drive wheels and right and left auxiliary drive wheels. Other than power transmission members that transmit driving force from the driving source to the front or rear right and left main drive wheels in the two-wheel drive mode, there is another power transmission member that transmits driving force to the auxiliary drive wheels in the four-wheel drive mode and that is rotated in the two-wheel drive mode. As a result, part of power is consumed because of rotational resistance that is generated by rotation of the other power transmission member, which may lead to undesirable influence on fuel economy of the vehicle.

In contrast, there has been suggested a four-wheel drive vehicle including a right and left driving force distribution unit equipped with a disconnect mechanism. In the two-wheel drive mode, the disconnect mechanism is used to disconnect the other power transmission member (propeller shaft) from drive wheels that are used in the four-wheel drive mode. The other power transmission member transmits driving force for a four-wheel drive mode. This is, for example, a four-wheel drive vehicle shown in FIG. 1 of U.S. Pat. No. 8,313,407.

A rear wheel-side right and left driving force distribution unit shown in FIG. 1 of U.S. Pat. No. 8,313,407 includes a differential gear unit in order to distribute driving force to right and left drive wheels. Instead of the differential gear unit, it is conceivable that a pair of friction clutches for right and left distributing driving force are respectively provided in right and left axles so as to be in series with the disconnect mechanism as shown in, for example, FIG. 7 of U.S. Pat. No. 8,313,407. With this configuration, a differential gear case fixed to a ring gear of the differential gear unit, a pair of side gears opposed to each other inside the differential gear case, pinions rotatably supported by a pinion pin fixed to the differential gear case, and the like, are unnecessary. The diameter of the ring gear is reduced.

SUMMARY OF THE INVENTION

When a right and left driving force distribution mechanism is provided in a vehicle in addition to a disconnect mechanism as described above, a pair of friction clutches are required in addition to a meshing ring, a slide fork and an actuator for the slide fork. The pair of friction clutches function as a right and left driving force distribution mechanism. The meshing ring, the slide fork and the actuator constitute the disconnect mechanism. The meshing ring couples a pair of concentric gears to each other. The slide fork is engaged with the meshing ring. Thus, there are drawbacks of high manufacturing cost due to an increase in the size and weight of the unit but also a low lateral symmetry of the right and left driving force distribution unit.

The invention provides a right and left driving force distribution unit for a four-wheel drive vehicle, which does not increase the size and weight of the unit and which has a high lateral symmetry.

An aspect of the invention provides a right and left driving force distribution unit for a four-wheel drive vehicle. The four-wheel drive vehicle includes a driving source, first drive wheels, and second drive wheels. The right and left driving force distribution unit includes a cylindrical ring gear, an output shaft, a disconnect mechanism, and an actuator. The cylindrical ring gear has first external teeth and a support portion in an axial direction of the cylindrical ring gear. The support portion of the cylindrical ring gear is supported by a case so as to rotate around an axis of the cylindrical ring gear. The cylindrical ring gear is configured such that driving force is transmitted from the driving source in a four-wheel drive mode. The output shaft extends through the cylindrical ring gear and is supported to rotate concentrically with the cylindrical ring gear. The output shaft is configured to output driving force to the right and left second drive wheels. The driving force is transmitted to the cylindrical ring gear. The disconnect mechanism includes a movable engagement member configured to move in the axial direction of the cylindrical ring gear. The disconnect mechanism is configured to connect an inner periphery of the cylindrical ring gear to an outer periphery of the output shaft or disconnect the inner periphery of the cylindrical ring gear from the outer periphery of the output shaft on the basis of a moved position of the movable engagement member. The actuator is disposed such that the first external teeth are located between the support portion and the actuator. The actuator is configured to (i) move the movable engagement member between a connection position and a disconnection position, the cylindrical ring gear being coupled to the output shaft so as to be relatively non-rotatable in the connection position, relative rotation between the cylindrical ring gear and the output shaft being allowed in the disconnection position, (ii) selectively carry out a two-wheel drive mode and the four-wheel drive mode, driving force being transmitted from the driving source to the right and left first drive wheels in the two-wheel drive mode, driving force being transmitted from the driving source to the drive wheels and the second drive wheels in the four-wheel drive mode, and (iii) disconnect a power transmission member from the second drive wheels in the two-wheel drive mode, the power transmission member being configured to transmit driving force to the second drive wheels in the four-wheel drive mode.

According to the above aspect, in comparison with the case where the disconnect mechanism is formed of a meshing ring that couples a pair of concentric gears to each other, a slide fork engaged with the meshing ring, and an actuator for the slide fork, the size and weight of the right and left driving force distribution unit do not increase. Therefore, the lateral symmetry of the right and left driving force distribution unit is high. Thus, it is possible to improve mountability to the vehicle.

In the above aspect, the disconnect mechanism may include internal teeth and second external teeth, the internal teeth may be formed on the inner periphery of the cylindrical ring gear, the second external teeth may be formed on an outer periphery of the movable engagement member, and the second external teeth may be engaged with the internal teeth of the cylindrical ring gear. At least part of the movable engagement member in a longitudinal direction of the movable engagement member may be arranged inside the cylindrical ring gear, the movable engagement member may be a cylindrical member, the movable engagement member may be provided on the outer periphery of the output shaft so as to move in the axial direction of the cylindrical ring gear and to be relatively non-rotatable around the axis of the cylindrical ring gear. According to the above aspect, the size and weight of a so-called dog clutch are significantly reduced, and the lateral symmetry of the right and left driving force distribution unit is high.

In the above aspect, the right and left driving force distribution unit may further include a pair of electronically controlled couplings respectively coupled to both ends of the output shaft. The pair of electronically controlled couplings may be configured to control driving force that is transmitted from the output shaft to second drive wheels. According to the above aspect, it is possible to control the distribution of driving force to the right and left auxiliary drive wheels by the pair of electronically controlled couplings. Thus, not only the differential gear unit is unnecessary, but also, for example, it is possible to control the distribution of driving force to the right and left drive wheels for transitionally controlling the behavior of the vehicle in association with a road surface or steering operation.

In the above aspect, the pair of electronically controlled couplings may be accommodated inside the case in a state where the pair of electronically controlled couplings are integrally fixed to the output shaft at both right and left ends of the output shaft. The output shaft and the pair of electronically controlled couplings may be supported by the case via a pair of right and left bearings so as to rotate, and the pair of right and left bearings may support the pair of electronically controlled couplings. According to the above aspect, the output shaft and the pair of electronically controlled couplings are supported by the case via the pair of right and left bearings so as to be rotatable The bearing mechanism is simply configured, and the size of the right and left driving force distribution unit is further reduced.

In the above aspect, a spring and an electromagnetic trip mechanism may be provided. The spring may be configured to urge the movable engagement member in the axial direction of the cylindrical ring gear from the disconnection position toward the connection position. The electromagnetic trip mechanism may be configured to latch the movable engagement member at the disconnection position by moving the movable engagement member at the connection position toward the disconnection position by a predetermined stroke against an urging force of the spring by using an electromagnet that operates in response to a disconnect command signal. The electromagnetic trip mechanism may be configured to unlatch the movable engagement member at the disconnection position by using the electromagnet that operates in response to a connect command signal and allow the movable engagement member to move to the connection position under the urging force of the spring. According to the above aspect, the movable engagement member located inside the cylindrical ring gear is moved in the axial direction by the actuator via the electromagnetic trip mechanism, and the movable engagement member is selectively located at the disconnection position or the connection position.

In the above aspect, the right and left driving force distribution unit may further include a synchronization mechanism that includes a gear-side friction engagement member and a movable-side friction engagement member. The gear-side friction engagement member may be provided to the electromagnetic trip mechanism side of the cylindrical ring gear so as to be relatively non-rotatable. The movable-side friction engagement member may be provided on the outer periphery of the output shaft so as to be relatively non-rotatable and to relatively move in the axial direction of the cylindrical ring gear. The movable-side friction engagement member may be urged by the spring. The synchronization mechanism may be configured to synchronize rotation of the movable engagement member with rotation of the cylindrical ring gear by causing the gear-side friction engagement member and the movable-side friction engagement member to be in sliding contact with each other before the movable engagement member at the disconnection position is moved to the connection position. According to the above aspect, the gear-side friction engagement member and the movable-side friction engagement member are caused to be in sliding contact with each other by the synchronization mechanism before the movable engagement member is moved to the connection position. Thus, rotation of the movable engagement member is synchronized with rotation of the cylindrical ring gear, and the internal teeth formed on the inner periphery of the cylindrical ring gear are smoothly meshed with the external teeth formed on the outer periphery of the movable engagement member.

In the above aspect, the four-wheel drive vehicle may include a propeller shaft configured to input driving force to a drive pinion of the right and left driving force distribution unit, and the driving force may be output from the driving source. The right and left driving force distribution unit may distribute the driving force to the right and left rear wheels of the four-wheel drive vehicle. The cylindrical ring gear may be a bevel gear formed of a hypoid gear that meshes with the drive pinion.

In the above aspect, the four-wheel drive vehicle may include a transfer and a separating device. The transfer may be configured to transmit driving force to the propeller shaft. The driving force may be output from the driving source. The separating device may be configured to interrupt transmission of driving force from the driving source to the propeller shaft in the two-wheel drive mode. In the two-wheel drive mode, the propeller shaft may be disconnected from the driving source by the separating device, and the propeller shaft may be disconnected from the rear wheels by the disconnect mechanism. The separating device may be a friction clutch, a dog clutch, or the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. In the following embodiment, the drawings are modified or simplified where appropriate, and the scale ratio, shape, and the like, of each portion are not always drawn accurately.

Figure 1:
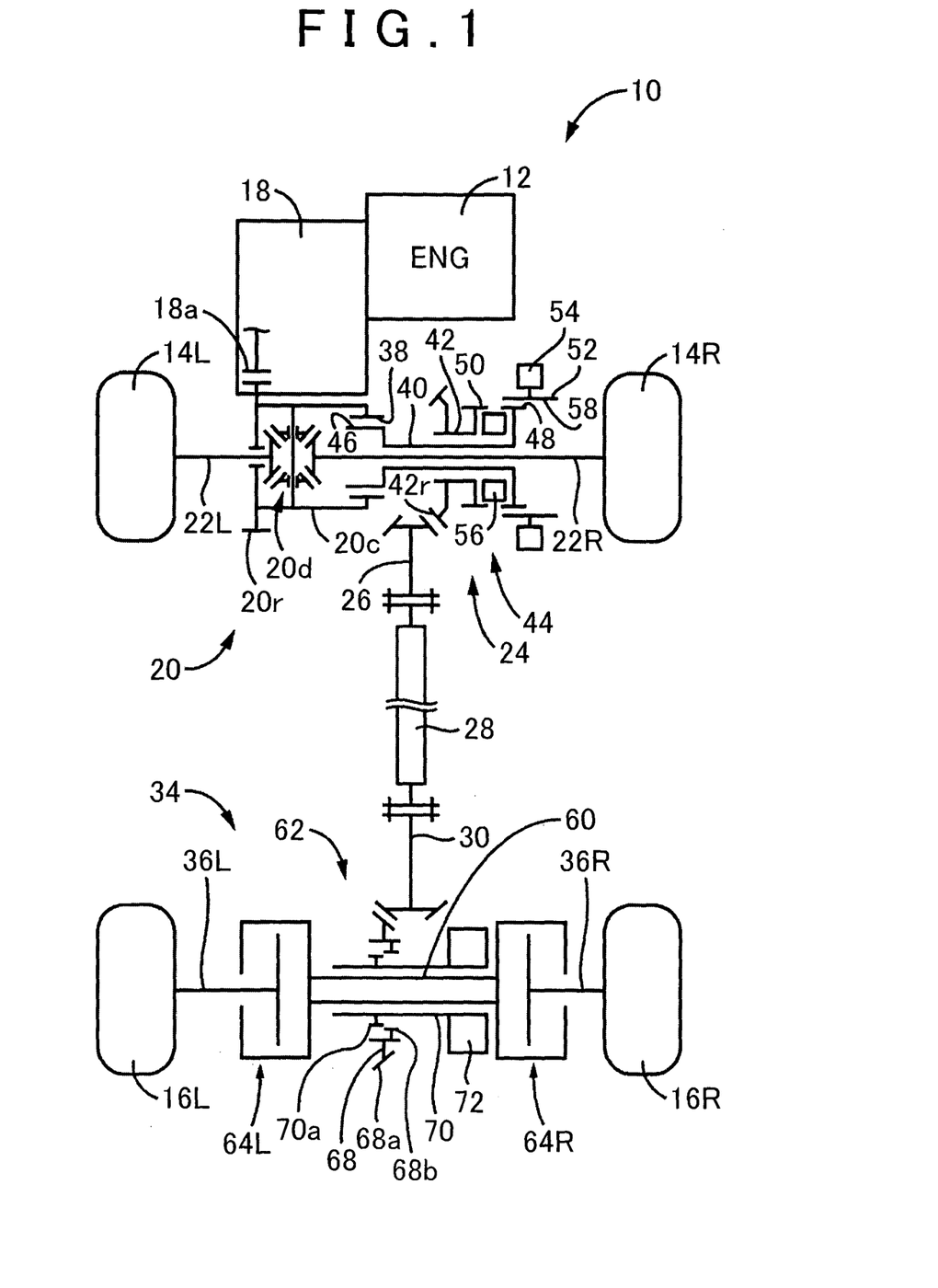
FIG. 1 is a skeletal view that schematically illustrates the configuration of a powertrain of a four-wheel drive vehicle including a right and left driving force distribution unit according to an embodiment of the invention.

FIG. 1 is a skeletal view that schematically illustrates the configuration of a four-wheel drive vehicle 10 to which the invention is suitably applied. In FIG. 1, the four-wheel drive vehicle 10 includes an engine 12 as a driving source. The four-wheel drive vehicle 10 includes an FF-base four-wheel drive system that includes a first power transmission path and a second power transmission path. The first power transmission path transmits power of the engine 12 to right and left front wheels 14R, 14L (unless specifically distinguished from each other, referred to as front wheels 14) corresponding to main drive wheels. The second power transmission path transmits power of the engine 12 to right and left rear wheels 16R, 16L (unless specifically distinguished from each other, referred to as rear wheels 16) corresponding to auxiliary drive wheels. In a two-wheel drive mode of the four-wheel drive vehicle 10, driving force transmitted from the engine 12 via an automatic transmission 18 is transmitted to the right and left front wheels 14R, 14L via a front wheel driving force distribution unit 20 and right and left axles 22R, 22L. In the two-wheel drive mode, at least a first clutch 44 is released, and power of the engine 12 is not transmitted to a transfer 24, a propeller shaft 28, a rear wheel driving force distribution unit 34 and the rear wheels 16. In a four-wheel drive mode, in addition to the above-described two-wheel drive mode, the first clutch 44 and a second clutch 62 both are engaged. In addition, torque that is transmitted from the engine 12 to a left axle 36L and the left rear wheel 16L is controlled by a left coupling 64L. Torque that is transmitted from the engine 12 to a right axle 36R and the right rear wheel 16R is controlled by a right coupling 64R. Although not shown in FIG. 1, a torque converter or a clutch is provided between the engine 12 and the automatic transmission 18. The torque converter is a fluid transmission device.

The automatic transmission 18 is, for example a stepped automatic transmission. The stepped automatic transmission includes a plurality of planetary gear units and friction engagement devices (a clutch and a brake). A speed position of the stepped automatic transmission is selected by selectively engaging those friction engagement devices. Alternatively, the automatic transmission 18 may be a stepped automatic transmission in which a speed position of a constant mesh parallel shaft transmission is selected by a shift actuator and a select actuator. Alternatively, the automatic transmission 18 may be a continuously variable transmission of which a speed ratio is continuously changed by changing the effective diameters of a pair of variable pulleys having variable effective diameters and around which a transmission belt is wound. Because the automatic transmission 18 is a known technique, the description of specific structure and operation is omitted.

The front wheel driving force distribution unit 20 is formed of a differential gear unit. The front wheel driving force distribution unit 20 includes a ring gear 20r, a differential case 20c and a differential gear mechanism 20d. The differential case 20c is fixed to the ring gear 20r. The differential gear mechanism 20d is accommodated in the differential case 20c. The ring gear 20r is provided so as to be rotatable around one axis, and is in mesh with an output gear 18a of the automatic transmission 18. The front wheel driving force distribution unit 20 transmits driving force to the right and left axles 22R, 22L of the front wheels 14 while allowing differential rotation between the right and left axles 22R, 22L. Internal teeth 38 are formed on the differential case 20c. The internal teeth 38 are in mesh with external teeth 46. The external teeth 46 are formed at a shaft end of a first rotating member 40 of the transfer 24. Thus, the transfer 24 is coupled to the differential case 20c of the front wheel driving force distribution unit 20. The transfer 24 transmits driving force, output from the engine 12, to the rear wheels 16.

The transfer 24 includes the first rotating member 40 and a second rotating member 42. The external teeth 46 are formed on the first rotating member 40. A ring gear 42r is formed on the second rotating member 42. The ring gear 42r is used to transmit power toward the rear wheels 16. Those first rotating member 40 and second rotating member 42 are selectively connected or disconnected by the first clutch 44 formed of a dog clutch.

The first rotating member 40 is a cylindrical member through which the axle 22R extends through the radially inner side of the first rotating member 40 (that is, the axle 22R is arranged on the radially inner side of the first rotating member 40). The first rotating member 40 is rotatably provided concentrically with the axle 22R and the second rotating member 42. The external teeth 46 are formed at one end of the first rotating member 40 in the axial direction. When the external teeth 46 are fitted to the internal teeth 38 formed on the differential case 20c, the first rotating member 40 rotates integrally with the differential case 20c of the front wheel driving force distribution unit 20. Clutch teeth 48 are formed at the other end of the first rotating member 40 in the axial direction. The clutch teeth 48 constitute the first clutch 44.

The second rotating member 42 is a cylindrical member. The axle 22R and the first rotating member 40 extend through the radially inner side of the second rotating member 42. The ring gear 42r is formed at one end of the second rotating member 42 in the axial direction. The ring gear 42r is in mesh with a driven pinion 26. Clutch teeth 50 are formed at the other end of the second rotating member 42 in the axial direction. The clutch teeth 50 constitute the first clutch 44. The driven pinion 26 is connected to the front end of the propeller shaft 28. A drive pinion 30 is provided at the rear end of the propeller shaft 28.

The first clutch 44 is a dog clutch for connecting the first rotating member 40 to the second rotating member 42 or disconnecting the first rotating member 40 from the second rotating member 42. The first clutch 44 is a dog clutch (separating device), and includes the clutch teeth 48, a sleeve 52 and a first clutch actuator 54. The clutch teeth 48 are formed on the first rotating member 40. Internal teeth 58 are formed on the sleeve 52. The internal teeth 58 are constantly in mesh with the clutch teeth 48 so as to be relatively movable in the axial direction, and are able to further mesh with the clutch teeth 50 when the sleeve 52 is moved in the axial direction. The clutch teeth 50 are formed on the second rotating member 42. The first clutch actuator 54 actuates the sleeve 52 in the axial direction between a non-meshing position of the sleeve 52 and a meshing position of the sleeve 52. The first clutch actuator 54 is formed of an electrically controllable actuator including an electromagnet. The first clutch 44 suitably includes a synchronization mechanism 112. The synchronization mechanism 112 reduces a relative rotation difference between the internal teeth 58 and the clutch teeth 50 at the time when the internal teeth 58 mesh with the clutch teeth 50. FIG. 1 shows a state where the first clutch 44 is released.

The rear wheel driving force distribution unit 34 includes the second clutch 62 and both the right coupling 64R and the left coupling 64L in series in a power transmission path from the propeller shaft 28 to the right and left rear wheels 16R, 16L. The right coupling 64R is a friction engagement-type electronically controlled coupling that controls torque transmitted between the second clutch 62 and the right rear wheel 16R. The left coupling 64L is a friction engagement-type electronically controlled coupling that controls torque transmitted between the second clutch 62 and the left rear wheel 16L. The second clutch 62 is a dog clutch (separating device) for connecting the propeller shaft 28 to the right and left rear wheels 16R, 16L or disconnecting the propeller shaft 28 from the right and left rear wheels 16R, 16L.

In the rear wheel driving force distribution unit 34, the left coupling 64L is arranged between a center axle 60 and the left axle 36L, and the right coupling 64R is arranged between the center axle 60 and the right axle 36R. The rear wheel driving force distribution unit 34 includes a ring gear 68. The ring gear 68 is concentric with the center axle 60 and is relatively rotatable with respect to the center axle 60. The ring gear 68 has spline-shaped external teeth 68a that are in mesh with the drive pinion 30. The second clutch 62 is arranged so as to connect the center axle 60 to the ring gear 68 or disconnect the center axle 60 from the ring gear 68. The ring gear 68 is, for example, a bevel gear in which a hypoid gear is formed. The ring gear 68 includes internal teeth 68b. The position of the internal teeth 68b is the same as the position of the external teeth 68a in the axial direction, or partially overlaps with the position of the external teeth 68a in the axial direction. The second clutch 62 includes a movable sleeve 70 and a second clutch actuator 72. The movable sleeve 70 has external teeth 70a that are engageable with the internal teeth 68b. The movable sleeve 70 is provided on the center axle 60 so as to be relatively non-rotatable and relatively movable in the axial direction. The second clutch actuator 72 actuates the movable sleeve 70 in the axial direction, and positions the movable sleeve 70 between a connection position (engaged position) and a disconnection position (non-engaged position). In the connection position, the external teeth 70a mesh with the internal teeth 68b. In the disconnection position, the external teeth 70a are separated from the internal teeth 68b.

Figure 2:
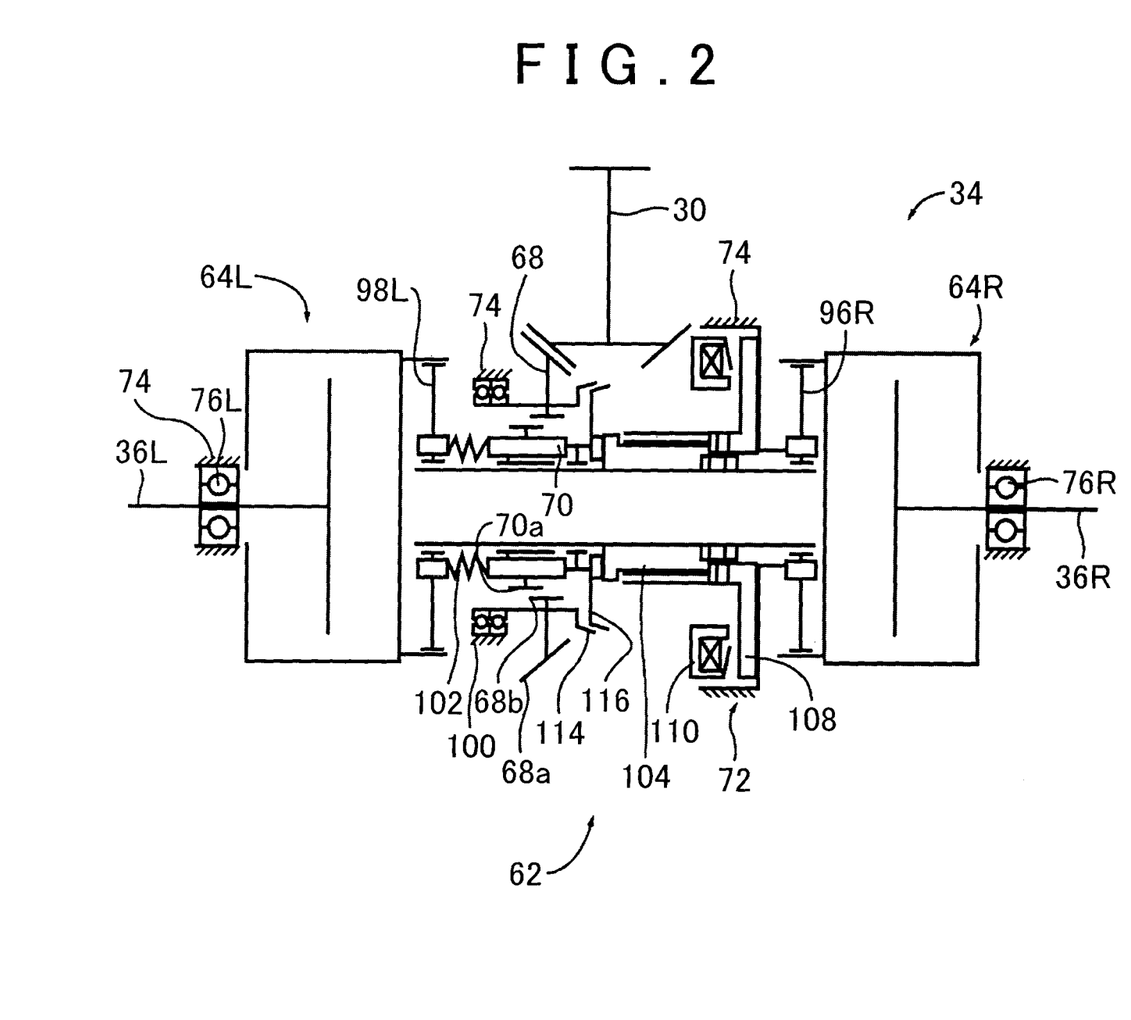
FIG. 2 is a skeletal view that schematically illustrates the right and left driving force distribution unit shown in FIG. 1.
Figure 3:
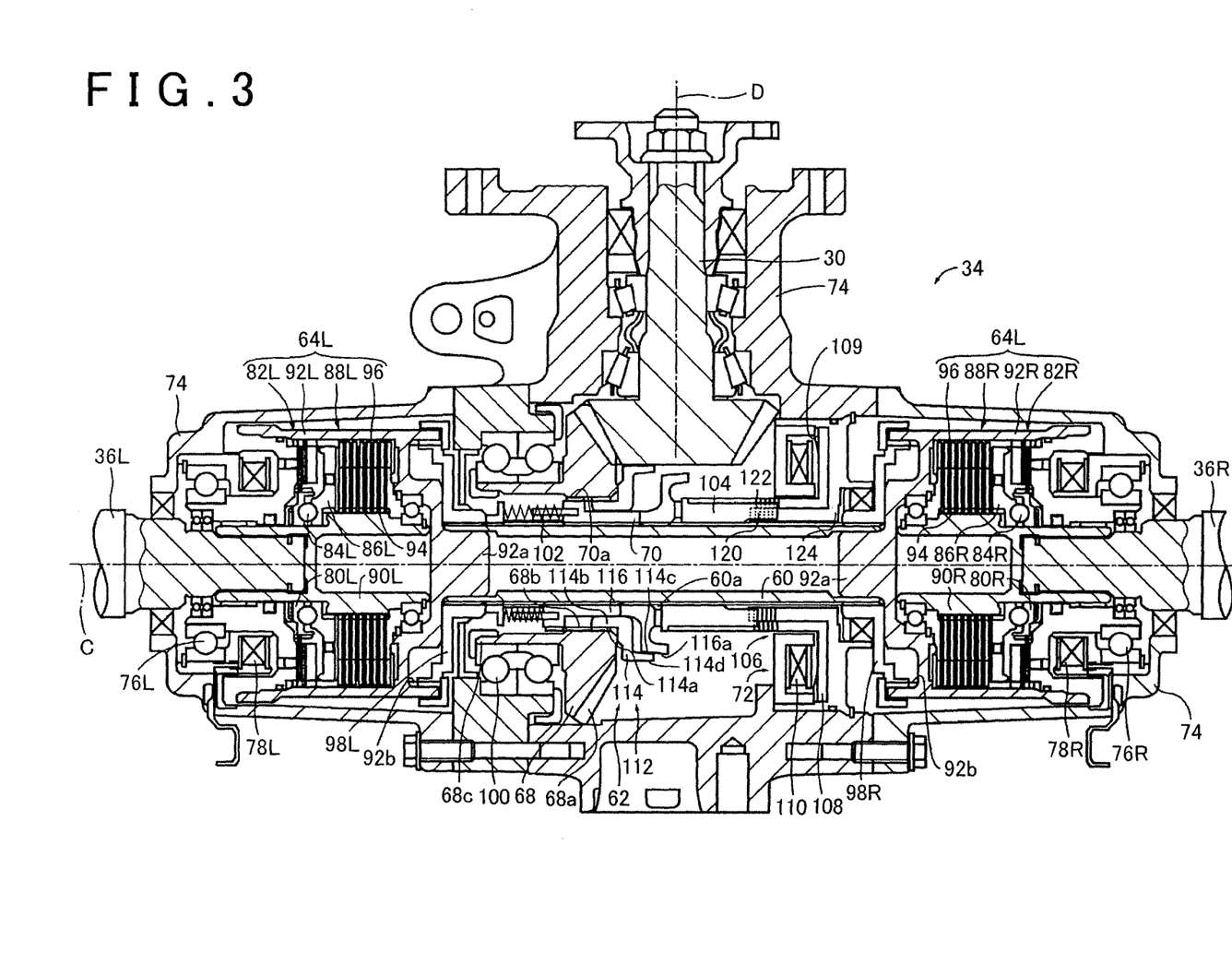
FIG. 3 is a cross-sectional view that closely illustrates the right and left driving force distribution unit shown in FIG. 1 and FIG. 2.

FIG. 2 and FIG. 3 are respectively a skeletal view and a cross-sectional view that illustrate a specific example of the rear wheel driving force distribution unit 34. In FIG. 2 and FIG. 3, inside a unit case 74, the left coupling 64L, the center axle 60, the second clutch 62, the ring gear 68 and the right coupling 64R are sequentially arranged concentrically with an axis C parallel to the lateral direction of the vehicle. The second clutch 62 and the ring gear 68 are located on the radially outer side of the center axle 60. These are supported rotatably around the axis C by a pair of right and left bearings 76R, 76L each formed of a ball bearing.

The right coupling 64R includes an annular electromagnet 78R, an auxiliary friction engagement device 82R, a main pressing member 86R and a main friction engagement device 88R. The left coupling 64L includes an annular electromagnet 78L, an auxiliary friction engagement device 82L, a main pressing member 86L and a main friction engagement device 88L. The annular electromagnets 78R, 78L are fixed to the unit case 74 that is a non-rotating member. The auxiliary friction engagement device 82R generates friction torque in an auxiliary pressing member 80R by magnetic force that is generated by the annular electromagnet 78R. The auxiliary friction engagement device 82L generates friction torque in an auxiliary pressing member 80L by magnetic force that is generated by the annular electromagnet 78L. The main pressing member 86R sandwiches spherical rolling elements 84R in inclined recessed grooves with the auxiliary pressing member 80R. The main pressing member 86L sandwiches spherical rolling elements 84L in inclined recessed grooves with the auxiliary pressing member 80L. The main friction engagement device 88R generates friction torque upon reception of thrust that is generated by relative rotation of the auxiliary pressing member 80R with respect to the main pressing member 86R. The main friction engagement device 88L generates friction torque upon reception of thrust that is generated by relative rotation of the auxiliary pressing member 80L with respect to the main pressing member 86L. The main friction engagement device 88R includes a clutch hub 90R, a clutch drum 92R, hub-side friction plates 94 and case-side friction plates 96. The main friction engagement device 88L includes a clutch hub 90L, a clutch drum 92L, hub-side friction plates 94 and case-side friction plates 96. The clutch hub 90R is fitted to the right axle 36R. The clutch hub 90R is coupled to the right axle 36R so as to be relatively non-rotatable, and rotates together with the right axle 36R. The clutch hub 90L is fitted to the left axle 36L. The clutch hub 90L is coupled to the left axle 36L so as to be relatively non-rotatable, and rotates together with the left axle 36L. The hub-side friction plates 94 and the case-side friction plates 96 are respectively mounted on the clutch hub 90R and the clutch drum 92R so as to be relatively non-rotatable, and are alternately stacked on top of each other. Similarly, the hub-side friction plates 94 and the case-side friction plates 96 are respectively mounted on the clutch hub 90L and the clutch drum 92L so as to be relatively non-rotatable, and are alternately stacked on top of each other. Thus, the right coupling 64R transmits torque based on an exciting current (torque command value) to the right rear wheel 16R. The exciting current (torque command value) is supplied from an electronic control unit (not shown) to the annular electromagnet 78R. The left coupling 64L transmits torque based on an exciting current (torque command value) to the left rear wheel 16L. The exciting current (torque command value) is supplied from an electronic control unit (not shown) to the annular electromagnet 78L.

The right and left clutch drums 92L, 92R respectively have bosses 92a that project from their center portions in directions in which the bosses 92a approach each other in the axis C direction. Both ends of the tubular center axle 60 are respectively fitted to the bosses 92a. The right and left clutch drums 92R, 92L are respectively coupled to both ends of the center axle 60 so as to be relatively non-rotatable. Spline teeth 60a are formed on the outer periphery of the center axle 60 over the entire outer periphery in the longitudinal direction. Internal gears 92b are respectively integrally formed at the radially outer portions of the right and left clutch drums 92R, 92L. The internal gears 92 protrude in a direction in which the internal gears 92b approach each other. A disc-shaped torque transmission member 98R is provided such that the radially inner portion of the torque transmission member 98R is in mesh with the spline teeth 60a of the center axle 60 and the radially outer portion of the torque transmission member 98R is in mesh with the internal gear 92b projecting from the radially outer portion of the right clutch drum 92R. A disc-shaped torque transmission member 98L is provided such that the radially inner portion of the torque transmission member 98L is in mesh with the spline teeth 60a of the center axle 60 and the radially outer portion of the torque transmission member 98L is in mesh with the internal gear 92b projecting from the radially outer portion of the left clutch drum 92L.

The ring gear 68 includes the external teeth 68a and the internal teeth 68b. The external teeth 68a are in mesh with the drive pinion 30. The internal teeth 68b selectively mesh with the spline teeth 60a of the center axle 60 via the second clutch 62. The ring gear 68 includes a cylindrical shaft portion 68c. The ring gear 68 is supported in a state where the center axle 60 extends through the ring gear 68 such that the ring gear 68 rotates around the axis C by the unit case 74 via a bearing 100 fitted to the shaft portion 68c. That is, the ring gear 68 includes the external teeth 68a and a support portion in the axis C direction of the ring gear 68. The support portion is supported to rotate around the axis C of the ring gear 68 by the unit case 74 via the bearing 100.

The second clutch 62 is a dog clutch (separating device) for connecting the propeller shaft 28 to the right and left rear wheels 16R, 16L or disconnecting the propeller shaft 28 from the right and left rear wheels 16R, 16L. The second clutch 62 is a similar dog clutch to the first clutch 44. The second clutch 62 disconnects the propeller shaft 28 from the right and left rear wheels 16R, 16L in the two-wheel drive mode in which the first clutch 44 is released. Thus, transmission of rotation from the right and left rear wheels 16R, 16L to the propeller shaft 28 is interrupted, so the running resistance of the vehicle due to the rotational resistance of the propeller shaft 28 is reduced. In the present embodiment, the second clutch 62 is an example of a disconnect mechanism.

The second clutch actuator 72 actuates the second clutch 62 to a released (disconnected) state or an engaged (connected) state. The second clutch actuator 72 is located on a side across the external teeth 68a of the ring gear 68 from the shaft portion 68c side at which the ring gear 68 is supported by the unit case 74 via the bearing 100, that is, on a side across a rotation axis D of the drive pinion 30 meshing with the ring gear 68 from the ring gear 68 (that is, the external teeth 68a of the ring gear 68 are arranged between the support portion of the ring gear 68 and the second clutch actuator 72 in the axis C direction of the ring gear 68). The second clutch actuator 72 includes a disc-shaped movable piece 108, an annular electromagnet 110 and a belleville spring 109. The disc-shaped movable piece 108 is arranged inside the unit case 74 so as to be movable in the axis C direction. The annular electromagnet 110 magnetically attracts the disc-shaped movable piece 108. The belleville spring 109 is arranged in a compressed state between the electromagnet 110 and the movable piece 108. A spring 102 is provided between the ring gear 68, that is, the shaft portion 68c of the ring gear 68, and the center axle 60. The spring 102 is arranged between the torque transmission member 98L and the movable sleeve 70. The spring 102 constantly urges the movable sleeve 70 so that the movable sleeve 70 moves toward a side at which the external teeth 70a engage with the internal teeth 68b of the ring gear 68. A piston 104 is provided between the movable sleeve 70 and a ratchet mechanism 106 (described later). The piston 104 is provided so as to be relatively rotatable with respect to the center axle 60 and the movable sleeve 70. The piston 104 actuates the movable sleeve 70 toward a non-engaged side against the urging force of the spring 102. The ratchet mechanism 106 is provided between the piston 104 and the second clutch actuator 72. When the movable piece 108 is attracted by the electromagnet 110 against the urging force of the belleville spring 109 in the second clutch actuator 72, the ratchet mechanism 106 moves the movable sleeve 70 located at the connection position toward the disconnection position via the piston 104 against the urging force of the spring 102, and latches the movable piece 108 at the disconnection position. When the movable piece 108 is further attracted by the electromagnet 110 against the urging force of the belleville spring 109 in the second clutch actuator 72, the ratchet mechanism 106 unlatches the movable sleeve 70 located at the disconnection position and allows the movable sleeve 70 to move to the connection position under the urging force of the spring 109. Thus, when attraction operation of the movable piece 108 is successively carried out by the electromagnet 110 a predetermined number of times, such as about three to five times, the piston 104 sequentially moves the movable sleeve 70 toward the disconnection position indicated at the lower side of the axis C in FIG. 3. Thus, engagement of the external teeth 70a of the movable sleeve 70 with the internal teeth 68b of the ring gear 68 is released, and the second clutch 62 is released. When attraction operation of the movable piece 108 by the electromagnet 110 exceeds the predetermined number of times, the piston 104 and the movable sleeve 70 are allowed to move to the connection position indicated at the upper side of the axis C in FIG. 3 under the urging force of the spring 102. Thus, the external teeth 70a of the movable sleeve 70 are engaged with the internal teeth 68b of the ring gear 68, and the second clutch 62 is engaged.

The synchronization mechanism 112 is provided in order to synchronize the rotation speed of the movable sleeve 70 with the rotation speed of the ring gear 68 before the external teeth 70a of the movable sleeve 70 are engaged with the internal teeth 68b of the ring gear 68. As shown in FIG. 3, the synchronization mechanism 112 includes a small-diameter cylindrical portion 114b, a large-diameter cylindrical portion 114d, a gear-side friction engagement member 114 and a movable-side friction engagement member 116. External teeth 114a are formed on the small-diameter cylindrical portion 114b. The external teeth 114a engage with the internal teeth 68b of the ring gear 68. A conical internal friction face 114c is formed on the large-diameter cylindrical portion 114d. The conical internal friction face 114c has a larger diameter than the inside diameter of the ring gear 68 and has a smaller diameter than the external teeth 68a of the ring gear 68. The conical internal friction face 114c is slightly inclined with respect to the axis C. In the gear-side friction engagement member 114, in a state where a stepped face of the large-diameter cylindrical portion 114d is in contact with the ring gear 68, the small-diameter cylindrical portion 114b is fitted in the ring gear 68 so as to be relatively non-rotatable. A conical external friction face 116a is formed on the movable-side friction engagement member 116. The conical external friction face 116a is slidable on the conical internal friction face 114c. The movable-side friction engagement member 116 integrally protrudes radially outward from the piston 104-side shaft end of the movable sleeve 70. The mounting position, shape and size of each of the gear-side friction engagement member 114 and the movable-side friction engagement member 116 are set such that the conical internal friction face 114c and the conical external friction face 116a are in sliding contact with each other when the piston 104 and the movable sleeve 70 are fully moved toward the ring gear 68 in process in which attraction operation of the movable piece 108 by the electromagnet 110 exceeds the predetermined number of times.

Figure 4:
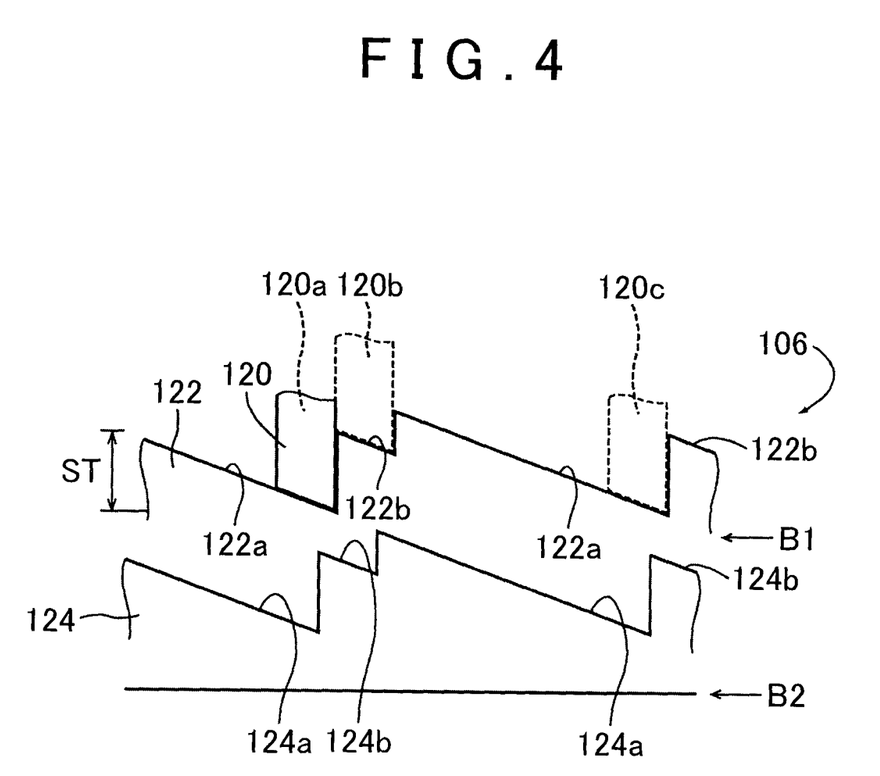
FIG. 4 is a view that closely illustrates an electromagnetic trip mechanism provided in the right and left driving force distribution unit shown in FIG. 3.
Figure 5:
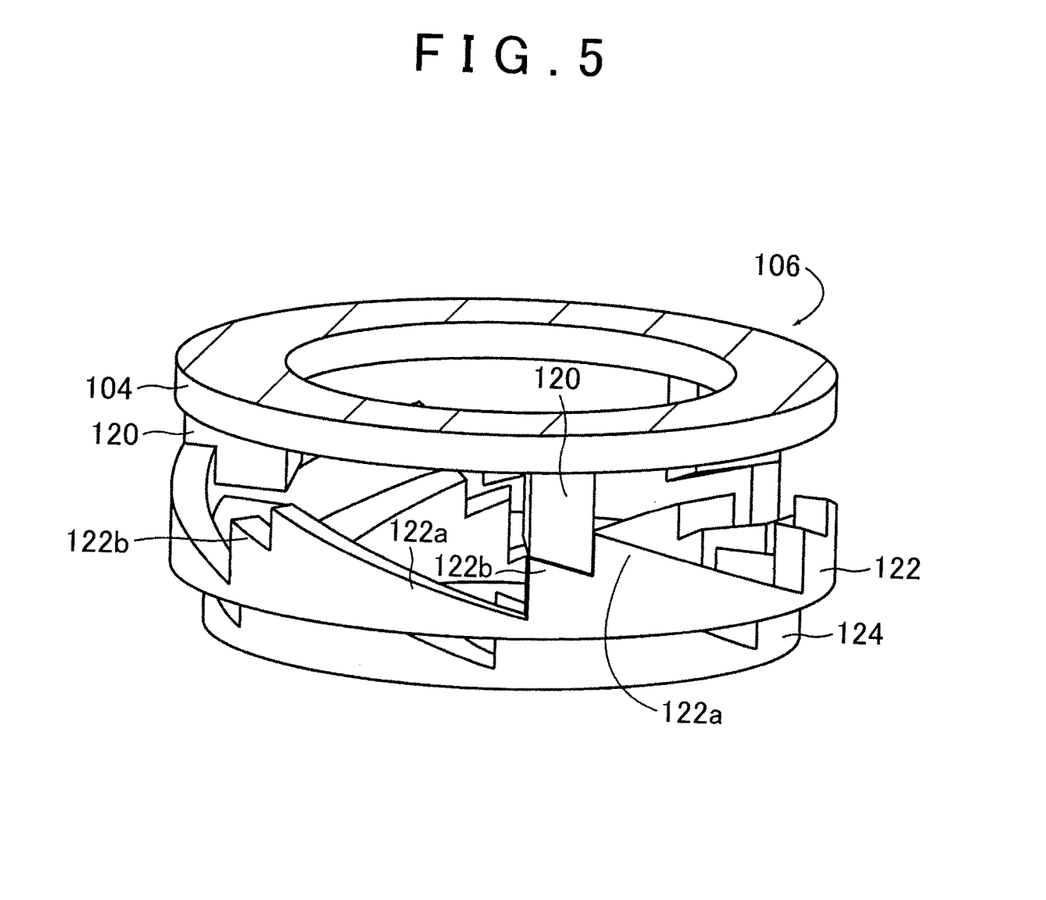
FIG. 5 is a perspective view that illustrates the overall configuration of an annular latch member and reciprocating member that constitute the electromagnetic trip mechanism shown in FIG. 4.

FIG. 4 is a schematic view that illustrates the operation principle of one example of the ratchet mechanism 106. FIG. 4 shows an annular latch member 122 and a reciprocating member 124 shown in FIG. 5 in developed view. The ratchet mechanism 106 functions as an electromagnetic trip mechanism. The ratchet mechanism 106 includes the latch member 122 and the reciprocating member 124. The latch member 122 is directly or indirectly fixed to the unit case 74. The reciprocating member 124 moves the piston 104 by one stroke of the movable piece 108 against the urging force of the spring 102. The latch member 122 has multi-step sawteeth for locking protrusions 120 in one direction in the circumferential direction. The protrusions 120 are provided on a right-side (electromagnet 110-side) end face of the piston 104. The multi-step sawteeth periodically have latch teeth 122a, 122b continuous in the circumferential direction of the axis C. The reciprocating member 124 is provided so as to be relatively non-rotatable with respect to the latch member 122 and to relatively move in the axis C direction together with the movable piece 108. The reciprocating member 124 has a similar sawtooth shape to those of the latch teeth 122a, 122b of the latch member 122, but the reciprocating member 124 is arranged in a state where the reciprocating member 124 is shifted by a half phase in the circumferential direction of the axis C with respect to the latch teeth 122a, 122b. The reciprocating member 124 periodically has receiving teeth 124a, 124b that receive the distal end of the piston 104. The pairs of two latch teeth 122a, 122b having different heights in the latch member 122 are formed so as to be close to the ring gear 68 side at a distance shorter than or equal to one stroke of the movable piece 108. The pairs of two receiving teeth 124a, 124b having different heights in the reciprocating member 124 are respectively formed in similar shapes to those of the latch teethes 122a, 122b, and are located so as to be shifted by a half phase in the circumferential direction with respect to the latch teeth 122a, 122b. In FIG. 4, the latch member 122 and the reciprocating member 124 are intentionally shifted in the axis C direction for the sake of easy understanding. In an initial state, the inclined faces of the receiving teeth 124b are substantially flush with the inclined faces of the latch teeth 122b. The initial state means a state where each of the protrusions 120 protruded from the piston 104 is located at a position 120a at which the protrusion 120 is latched by the latch tooth 122a when the movable sleeve 70 is located at the connection position. A stroke ST of the reciprocating member 124 is indicated as a stroke from a base position B1 that is the lower end of the inclined face of each of the latch teeth 122a.

In the initial state, when the reciprocating member 124 is reciprocated by the stroke ST by using the electromagnet 110 for the first time, the protrusions 120 move as a result of movement of the latch teeth 124b of the reciprocating member 124. Thus, each protrusion 120 crosses over the distal end of the latch tooth 122b against the urging force of the spring 102, slides onto the lowest end of the inclined face of the latch tooth 122b, and is latched to a position 120b. Subsequently, when the reciprocating member 124 is reciprocated by the stroke ST by using the electromagnet 110 for the second time, the protrusions 120 move as a result of movement of the latch teeth 124a of the reciprocating member 124. Thus, each protrusion 120 crosses over the distal end of the latch tooth 122a against the urging force of the spring 102, slides onto the lowest end of the inclined face of the latch tooth 122a, and is latched to a position 120c. Thus, each protrusion 120 is returned to the initial state that is the same as the position 120a. That is, when the reciprocating member 124 is reciprocated by the electromagnet 110 for the second time that is a predetermined number of times, the movable sleeve 70 is returned to the connection position. Thus, the external teeth 70a of the movable sleeve 70 are engaged with the internal teeth 68b of the ring gear 68, and the second clutch 62 is engaged.

Thus, the ratchet mechanism 106 sequentially moves the piston 104 toward the disconnection position while shifting the piston 104 in the circumferential direction one by one by a stroke larger than one stroke of the movable piece 108 by using the electromagnet 110. When the number of attraction operations of the movable piece 108 by the electromagnet 110 reaches the predetermined number of times, the piston 104 is located at the disconnection position. When the number of attraction operations of the movable piece 108 by the electromagnet 110 exceeds the predetermined number of times, the ratchet mechanism 106 unlatches the piston 104, and allows the movable sleeve 70 to move to the connection position under the urging force of the spring 102.

In process in which the reciprocating member 124 is reciprocated by the electromagnet 110 for the second time, when each protrusion 120 intends to cross over the distal end of the latch tooth 122a, the movable sleeve 70 is located at a position closest to the ring gear 68 side. The gear-side friction engagement member 114 and the movable-side friction engagement member 116 are caused to be in sliding contact with each other, and rotation of the ring gear 68 is synchronized with rotation of the movable sleeve 70 before the internal teeth 68b of the ring gear 68 are engaged with the external teeth 70a of the movable sleeve 70. The latch member 122 has two-step latch teeth 122a, 122b. The reciprocating member 124 has two types of latch teeth 124a, 124b. In order to further increase the stroke of the piston 104 as compared to one stroke of the movable piece 108, each of the latch member 122 and the reciprocating member 124 may have three or more steps of teeth.

As described above, the rear wheel driving force distribution unit (right and left driving force distribution unit) 34 for the four-wheel drive vehicle 10 according to the present embodiment includes the center axle (output shaft) 60, the second clutch (disconnect mechanism) 62, and the second clutch actuator 72. The center axle 60 extends through the cylindrical ring gear 68 supported at one end so as to be rotatable around the axis C. The center axle 60 is rotatably supported concentrically with the ring gear 68. The center axle 60 outputs driving force to the right and left auxiliary drive wheels 16R, 16L. The driving force is transmitted to the ring gear 68. The second clutch 62 includes the movable sleeve (movable engagement member) 70 that is moved in the axis C direction. The second clutch 62 connects the inner periphery of the ring gear 68 to the outer periphery of the center axle (output shaft) 60 or disconnects the inner periphery of the ring gear 68 from the outer periphery of the center axle 60 on the basis of a moved position of the movable sleeve 70. The second clutch actuator 72 is located at a side across the external teeth 68a of the ring gear 68 from a side at which the ring gear 68 is supported by the unit case 74 via the bearing 100. The second clutch actuator 72 moves the movable sleeve (movable engagement member) 70 between the connection position and the disconnection position. In the connection position, the ring gear 68 is coupled to the center axle (output shaft) 60 so as to be relatively non-rotatable. In the disconnection position, relative rotation between the ring gear 68 and the center axle (output shaft) 60 is allowed. Thus, in comparison with the case where the disconnect mechanism is formed of a meshing ring that couples a pair of concentric gears to each other, a slide fork engaged with the meshing ring, and an actuator for the slide fork, the size and weight of the rear wheel driving force distribution unit 34 do not increase. Therefore, the lateral symmetry of the rear wheel driving force distribution unit 34 is high, and mountability to the vehicle improves.

With the rear wheel driving force distribution unit (right and left driving force distribution unit) 34, the second clutch (disconnect mechanism) 62 includes the internal teeth 60b and the external teeth 70a. The internal teeth 60b are formed on the inner periphery of the cylindrical ring gear 68. The external teeth 70a are formed on the outer periphery of the movable sleeve (movable engagement member) 70, and are engageable with the internal teeth 68b of the ring gear 68. The movable sleeve (movable engagement member) 70 is a cylindrical member. At least part of the movable sleeve 70 in the longitudinal direction is inserted in the inner side of the ring gear 68. The movable sleeve 70 is provided on the outer periphery of the center axle (output shaft) 60 so as to be movable in the axis C direction and relatively non-rotatable around the axis C. Therefore, the size and weight of the second clutch (disconnect mechanism) 62 formed of a so-called dog clutch are significantly reduced, and the lateral symmetry of the right and left driving force distribution unit 34 is high.

With the rear wheel driving force distribution unit (right and left driving force distribution unit) 34 according to the present embodiment, the pair of right and left electronically controlled couplings (couplings) 64R, 64L are respectively coupled to both ends of the center axle (output shaft) 60. The pair of right and left electronically controlled couplings 64R, 64L control driving force that is transmitted from the center axle 60 to the right and left auxiliary drive wheels 16R, 16L. Therefore, it is possible to control the distribution of driving force to the right and left auxiliary drive wheels 16R, 16L with the pair of electronically controlled couplings 64R, 64L by the electronic control unit, so the differential gear unit is unnecessary. In addition, for example, it is possible to control the distribution of driving force to the right and left drive wheels for transitionally controlling the behavior of the vehicle in association with a road surface or steering operation.

With the rear wheel driving force distribution unit (right and left driving force distribution unit) 34 according to the present embodiment, the pair of right and left electronically controlled couplings (couplings) 64R, 64L are accommodated in the unit case (case) 74 of the right and left driving force distribution unit 34 in a state where the pair of electronically controlled couplings 64R, 64L are respectively integrally fixed to both right and let ends of the center axle (output shaft) 60. The center axle 60 and the pair of electronically controlled couplings 64R, 64L are rotatably supported by the unit case 74 via the pair of right and left bearings 76R, 76L that directly support the pair of electronically controlled couplings 64R, 64L. Therefore, the center axle 60 and the pair of electronically controlled couplings 64R, 64L are rotatably supported by the unit case 74 via the pair of right and left bearings 76R, 76L, so the bearing mechanism is simply configured, and the size of the right and left driving force distribution unit is further reduced.

With the rear wheel driving force distribution unit (right and left driving force distribution unit) 34 according to the present embodiment, the spring 102 and the electromagnetic trip mechanism 106 are provided. The spring 102 urges the movable sleeve (movable engagement member) 70 in the axis C direction from the disconnection position toward the connection position. The electromagnetic trip mechanism 106 moves the movable sleeve 70 at the connection position toward the disconnection position by the predetermined stroke against the urging force of the spring 102 by using the electromagnet 110 that operates in response to a disconnect command signal from the electronic control unit, and latches the movable sleeve 70 at the disconnection position. The electromagnetic trip mechanism 106 unlatches the movable sleeve 70 at the disconnection position by using the electromagnet 110 that operates in response to a connect command signal, and allows the movable sleeve 70 to move to the connection position under the urging force of the spring 102. With this configuration, the movable sleeve 70 located on the inner side of the ring gear 68 is moved in the axis C direction by the second clutch actuator 72 via the electromagnetic trip mechanism 106, so the movable sleeve 70 is selectively located at the disconnection position or the connection position.

The rear wheel driving force distribution unit (right and left driving force distribution unit) 34 according to the present embodiment includes the synchronization mechanism 112. The synchronization mechanism 112 includes the gear-side friction engagement member 114 and the movable-side friction engagement member 116. The gear-side friction engagement member 114 is provided on a side of the electromagnetic trip mechanism 106 to the ring gear 68 so as to be relatively non-rotatable. The movable-side friction engagement member 116 is provided on the outer periphery of the center axle 60 so as to be relatively non-rotatable and relatively movable in the axial direction. The movable-side friction engagement member 116 is urged by the spring 102. The synchronization mechanism 112 synchronizes rotation of the movable sleeve 70 with rotation of the ring gear 68 by causing the gear-side friction engagement member 114 and the movable-side friction engagement member 116 to be in sliding contact with each other before the movable sleeve (movable engagement member) 70 at the disconnection position is moved to the connection position. With this configuration, by using the synchronization mechanism 112, the gear-side friction engagement member 114 and the movable-side friction engagement member 116 are caused to be in sliding contact with each other before the movable sleeve 70 is moved to the connection position. Thus, rotation of the movable sleeve 70 is synchronized with rotation of the ring gear 68, and the internal teeth 68b formed on the inner periphery of the ring gear 68 are smoothly meshed with the external teeth 70a formed on the outer periphery of the movable sleeve 70.

With the rear wheel driving force distribution unit (right and left driving force distribution unit) 34 according to the present embodiment, the four-wheel drive vehicle 10 includes the propeller shaft 28. The propeller shaft 28 inputs driving force to the drive pinion 30 of the rear wheel driving force distribution unit 34. The driving force is output from the engine (driving source) 12. The rear wheel driving force distribution unit 34 distributes the driving force between the right and left rear wheels 16R, 16L of the four-wheel drive vehicle 10. The ring gear 68 is a bevel gear formed of a hypoid gear that meshes with the drive pinion 30. Thus, it is advantageous that it is possible to reduce the height of a vehicle body.

Next, another embodiment of the invention will be described. Like reference numerals denote portions common to the above-described first embodiment, and the description is omitted.

Figure 6:
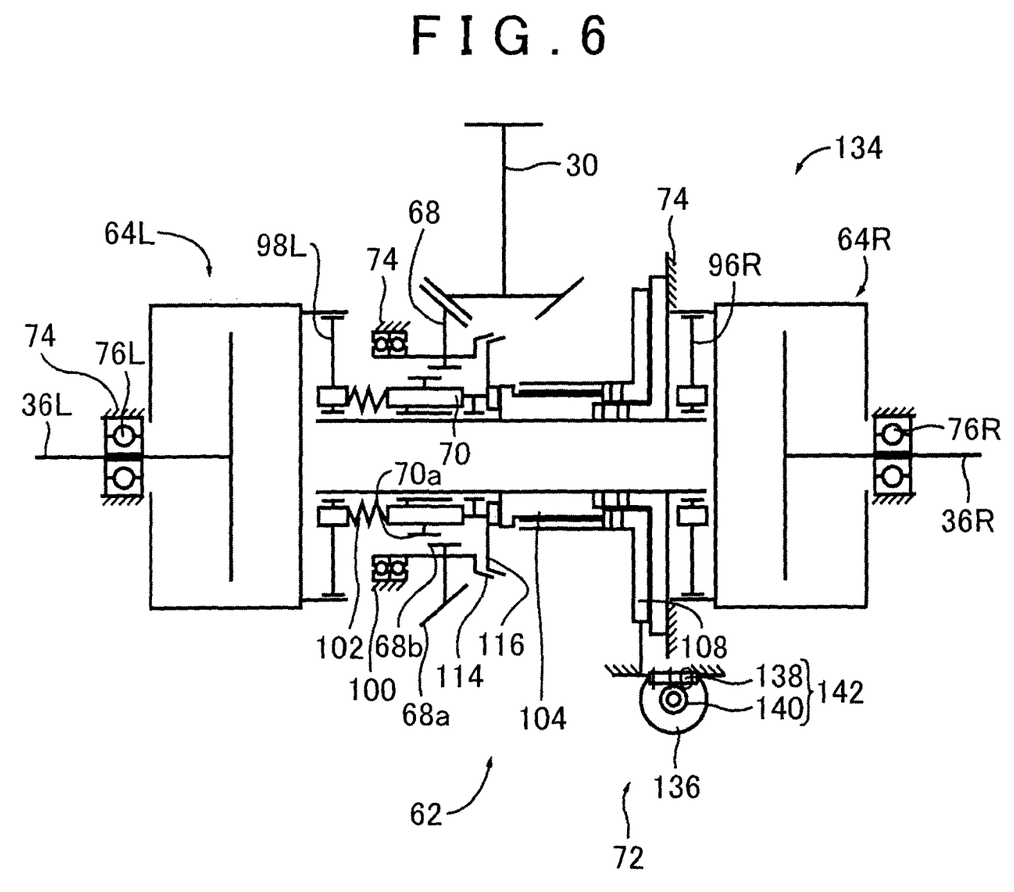
FIG. 6 is a skeletal view that illustrates another embodiment of the invention and that corresponds to FIG. 2.

FIG. 6 is a skeletal view that illustrates a rear wheel driving force distribution unit 134 according to another embodiment of the invention and that corresponds to FIG. 2. In the rear wheel driving force distribution unit 34 according to the first embodiment, the electromagnet 110 is used as an actuator that actuates the piston 104. In contrast, in the rear wheel driving force distribution unit 134 according to the present second embodiment, an electric motor 136 is used as an actuator that actuates the piston 104. As shown in FIG. 6, in the rear wheel driving force distribution unit 134, a rack 138 is provided on the movable piece 108. In the rear wheel driving force distribution unit 134, a pinion 140 is fixedly provided on an output shaft of the electric motor 136 fixed in position. The pinion 140 is in mesh with the rack 138. The movable piece 108 is actuated by the electric motor 136 in the axis C direction. In the present second embodiment, it is possible to obtain a large stroke of the movable piece 108. Thus, it is possible to directly couple the movable piece 108 to the piston 104. In this case, the ratchet mechanism 106 is unnecessary. In the present embodiment, the rack 138 and the electric motor 136 including the pinion 140 that is in mesh with the rack 138 constitute a third clutch actuator 142.

The embodiments of the invention are described in detail above with reference to the accompanying drawings; however, the invention is also applied to other embodiments.

For example, in the above-described embodiment, the FF-base four-wheel drive vehicle including the rear wheel driving force distribution unit 34 is employed. The invention is also applicable to an FR-base four-wheel drive vehicle, an RR-base four-wheel drive vehicle, or the like, as needed. In the FR-base four-wheel drive vehicle or the RR-base four-wheel drive vehicle, a right and left driving force distribution unit having a similar configuration to that of the rear wheel driving force distribution unit 34 is used for the front wheels.

In the rear wheel driving force distribution unit 34 of the four-wheel drive vehicle 10 according to the above-described embodiment, the ring gear 68 is a bevel gear that is in mesh with the drive pinion. Instead, the ring gear 68 may be a spur gear. The spur gear is provided around an axis parallel to the axis C, and is in mesh with an output gear of a transmission.

In the rear wheel driving force distribution unit 34 of the four-wheel drive vehicle 10 according to the above-described embodiment, instead of the pair of right and left couplings 64R, 64L, a differential gear unit may be provided at the right end or left end of the center axle 60. For example, when the differential gear unit is provided at the left end of the center axle 60, a differential case of the differential gear unit is coupled to the center axle 60, the left axle 36L is coupled to a left side gear of the differential gear unit, and the right axle 36R is coupled to a right side gear of the differential gear unit through the inside of the center axle 60.

In the four-wheel drive vehicle 10 according to the above-described embodiment, the ratchet mechanism 106 for operating the piston 104 by a stroke larger than the operation stroke ST of the movable piece 108 by the electromagnet 110 is provided in the second clutch actuator 72 between the second clutch actuator 72 for operating the second clutch 62 and the piston 104. Instead, an electromagnetic actuator having a large operation stroke or a hydraulic cylinder that hydraulically moves the piston 104 may be used as the second clutch actuator 72. In this case, the ratchet mechanism 106 is unnecessary.

The above-described embodiments are only illustrative. The invention may be implemented in modes including various modifications or improvements on the basis of the knowledge of persons skilled in the art.

What is claimed is:

1. A right and left driving force distribution unit for a four-wheel drive vehicle, the four-wheel drive vehicle including a driving source, first drive wheels, and second drive wheels, the right and left driving force distribution unit comprising:
   (a) a cylindrical ring gear having first external teeth and a support portion in an axial direction of the cylindrical ring gear, the support portion being supported by a case so as to rotate around an axis of the cylindrical ring gear, the cylindrical ring gear being configured such that driving force is transmitted from the driving source in a four-wheel drive mode;
   (b) an output shaft extending through the cylindrical ring gear and supported to rotate concentrically with the cylindrical ring gear, the output shaft being configured to output driving force to the second drive wheels, the driving force being transmitted to the cylindrical ring gear;
   (c) a disconnect mechanism that includes a movable engagement member configured to move in the axial direction of the cylindrical ring gear, the disconnect mechanism being configured to connect or disconnect an inner periphery of the cylindrical ring gear to an outer periphery of the output shaft based on a moved position of the movable engagement member; and
   (d) an actuator disposed such that the first external teeth are located between the support portion and the actuator, the actuator being configured to
      (i) move the movable engagement member between a connection position and a disconnection position, the cylindrical ring gear being coupled to the output shaft so as to be relatively non-rotatable in the connection position, relative rotation between the cylindrical ring gear and the output shaft being allowed in the disconnection position,
      (ii) selectively carry out a two-wheel drive mode and the four-wheel drive mode, the driving force being transmitted from the driving source to the first drive wheels in the two-wheel drive mode, the driving force being transmitted from the driving source to the first drive wheels and the second drive wheels in the four-wheel drive mode, and
      (iii) disconnect a power transmission member from the second drive wheels in the two-wheel drive mode, the power transmission member being configured to transmit the driving force to the second drive wheels in the four-wheel drive mode
   wherein the disconnect mechanism includes internal teeth and second external teeth, the internal teeth are provided on the inner periphery of the cylindrical ring gear, the second external teeth are provided on an outer periphery of the movable engagement member, the second external teeth are engaged with the internal teeth of the cylindrical ring gear,
   wherein at least part of the movable engagement member in a longitudinal direction of the movable engagement member is arranged inside the cylindrical ring gear, the movable engagement member is a cylindrical member, the movable engagement member is provided on the outer periphery of the output shaft so as to move in the axial direction of the cylindrical ring gear and to be relatively non-rotatable around the axis of the cylindrical ring gear; and
   wherein the right and left driving force distribution unit further comprises:
      a spring configured to urge the movable engagement member in the axial direction of the cylindrical ring gear from the disconnection position toward the connection position; and an electromagnetic trip mechanism configured to
(1) latch the movable engagement member at the disconnection position by moving the movable engagement member at the connection position toward the disconnection position by a predetermined stroke against an urging force of the spring by using an electromagnet that operates in response to a disconnect command signal, and
(2) unlatch the movable engagement member at the disconnection position by using the electromagnet that operates in response to a connect command signal and allow the movable engagement member to move to the connection position under the urging force of the spring.

2. The right and left driving force distribution unit according to claim 1, further comprising:
a pair of electronically controlled couplings respectively coupled to both ends of the output shaft, the pair of electronically controlled couplings being configured to control the driving force that is transmitted from the output shaft to the second drive wheels respectively.

3. The right and left driving force distribution unit according to claim 2, wherein
the pair of electronically controlled couplings are accommodated inside the case in a state where the pair of electronically controlled couplings are integrally fixed to the output shaft at both right and left ends of the output shaft, and
the output shaft and the pair of electronically controlled couplings are supported by the case via a pair of right and left bearings so as to rotate, and the pair of right and left bearings support the pair of electronically controlled couplings.

4. The right and left driving force distribution unit according to claim 1, further comprising:
a synchronization mechanism that includes a gear-side friction engagement member and a movable-side friction engagement member, the gear-side friction engagement member being provided to the electromagnetic trip mechanism side of the cylindrical ring gear so as to be relatively non-rotatable, the movable-side friction engagement member being provided on the outer periphery of the output shaft so as to be relatively non-rotatable and to relatively move in the axial direction of the cylindrical ring gear, the movable-side friction engagement member being urged by the spring, and the synchronization mechanism being configured to synchronize rotation of the movable engagement member with rotation of the cylindrical ring gear by causing the gear-side friction engagement member and the movable-side friction engagement member to be in sliding contact with each other before the movable engagement member at the disconnection position is moved to the connection position.

5. The right and left driving force distribution unit according to claim 1, wherein the four-wheel drive vehicle includes:
a propeller shaft configured to input the driving force output from the driving source to a drive pinion of the right and left driving force distribution unit.

* * * * *